United States Patent
Stevens et al.

(10) Patent No.: US 8,558,756 B2
(45) Date of Patent: Oct. 15, 2013

(54) DISPLAYING MESSAGES ON CREATED COLLECTIONS OF DISPLAYS

(75) Inventors: Mark B. Stevens, Austin, TX (US); Clifton E. Grim, Seabrook, TX (US); John D. Wilson, Houston, TX (US); Rex E. Marzke, Houston, TX (US); Gary A. Ward, Houston, TX (US)

(73) Assignee: International Business Machines Corporation, Armonk, NY (US)

( * ) Notice: Subject to any disclaimer, the term of this patent is extended or adjusted under 35 U.S.C. 154(b) by 770 days.

(21) Appl. No.: 12/770,723

(22) Filed: Apr. 30, 2010

(65) Prior Publication Data

US 2011/0267256 A1   Nov. 3, 2011

(51) Int. Cl.
   *G09G 5/00*   (2006.01)
(52) U.S. Cl.
   USPC .................. 345/1.1; 455/345; 455/456.3
(58) Field of Classification Search
   USPC .......................... 345/1.1; 455/345, 456.3
   See application file for complete search history.

(56) References Cited

U.S. PATENT DOCUMENTS

| | | | |
|---|---|---|---|
| 5,105,183 A | 4/1992 | Beckman | |
| 5,396,257 A | 3/1995 | Someya et al. | |
| 5,986,622 A | 11/1999 | Ong | |
| 6,250,428 B1 | 6/2001 | Amo et al. | |
| 6,559,813 B1 | 5/2003 | DeLuca et al. | |
| 7,466,244 B2 | 12/2008 | Kimchi et al. | |
| 7,525,510 B2 | 4/2009 | Beland et al. | |
| 2002/0009978 A1* | 1/2002 | Dukach et al. | 455/99 |
| 2004/0192351 A1* | 9/2004 | Duncan | 455/456.3 |
| 2005/0253774 A1* | 11/2005 | Choi | 345/1.1 |
| 2006/0004697 A1 | 1/2006 | Lipsky et al. | |
| 2007/0006077 A1 | 1/2007 | Grubbs | |
| 2007/0270985 A1 | 11/2007 | Shellshear | |
| 2008/0005771 A1 | 1/2008 | Salvador | |
| 2008/0100805 A1* | 5/2008 | Majumder et al. | 353/30 |
| 2008/0103896 A1 | 5/2008 | Flake et al. | |
| 2008/0275782 A1 | 11/2008 | Kaufman et al. | |
| 2009/0049097 A1* | 2/2009 | Nocifera et al. | 707/104.1 |
| 2009/0106671 A1 | 4/2009 | Olson et al. | |
| 2009/0248491 A1* | 10/2009 | Hemphill | 705/10 |
| 2010/0104105 A1* | 4/2010 | Schmidt et al. | 380/283 |

OTHER PUBLICATIONS

Russell et al.; "Using Multiple Segmentations to Discover Objects and Their Extent in Image Collections", IEEE Conf. on, vol. 2, 2006, pp. 1605-1614.
Kumar et al.; "Representation of Scenes from Collections of Images", Proceedings IEEE Workshop on, Jun. 24, 1995, pp. 10-17.
Philbin et al.; "Object Mining Using a Matching Graph on Very Large Image Collections", Sixth Indian Conf. on, Dec. 16-19, 2008, pp. 738-745.

* cited by examiner

*Primary Examiner* — Viet Pham
(74) *Attorney, Agent, or Firm* — Steven Bennett

(57) ABSTRACT

Collections of displays are created from a number of displays, based on display attributes of each display, to yield display collection attributes for each collection. It is determined whether any of a number of messages should be displayed on any of the collections of displays, based at least on message attributes of each message and on the display collection attributes of each collection. Where it has been determined that a given message should be displayed on a given collection of displays, at least a portion of the given message is transmitted to each display within the given collection to display the given message on the given collection of displays. The displays may be movable displays on vehicles and that are functional while the vehicles are moving, billboard displays on billboards along a road, stationary displays on buildings within a given location, or other types of displays.

15 Claims, 5 Drawing Sheets

DISPLAYING MESSAGES ON CREATED COLLECTIONS OF DISPLAYS

FIELD OF THE INVENTION

The present invention relates generally to displays on which messages can be displayed, and more particularly to creating collections of such displays on which messages can be displayed.

BACKGROUND OF THE INVENTION

What are commonly referred to as displays are electronic display devices that may be positioned in various locations for dynamically displaying messages to users, where the messages change over time. Messages can include images, including moving images such as video, as well as text, and even audio where the displays include speakers or are connected to speakers. Historically display devices have been traditionally small, extending tens of inches in their diagonal measurements, and which were typically positioned on a desktop or within a room for viewing by a relatively small number of users, down to a single user. More recently, display devices have become vastly larger in size, and include electronic billboards, projectors that project images onto large screens, and so on.

SUMMARY OF THE INVENTION

A method of an embodiment of the invention creates one or more collections of displays from a number of displays, by a computing device, based on display attributes of each display, to yield display collection attributes for each collection of displays. The method determines whether any of a number of messages should be displayed on any of the collections of displays, by the computing device, based at least on message attributes of each message and the display collection attributes of each collection of displays. Where the computing device has determined that a given message should be displayed on a given collection of displays, the method transmits at least a portion of the given message by the computing device to each display within the given collection of displays to display the given message on the given collection of displays.

A computing device of an embodiment of the invention includes a processor, first logic, second logic, and a hardware communication component. The first logic and the second logic are each implemented by the processor. The first logic is to create one or more collections of displays from a number of displays, based on display attributes of each display, yielding display collection attributes for each collection of displays. The second logic is to determine whether any of a number of messages should be displayed on any of the collections of displays, based at least on message attributes of each message and on the display collection attributes of each collection of displays. The hardware communication component is to, where the second logic has determined that a given message should be displayed on a given collection of displays, transmit at least a portion of the given message by the computing device to each display within the given collection of displays to display the given message on the given collection of displays.

A computer program product of an embodiment of the invention includes a computer-readable storage medium having computer-readable code embodied therein. The computer-readable code is executable by a computing device. The computer-readable code includes first computer-readable code, second computer-readable code, and third computer-readable code. The first computer-readable code is to create one or more collections of displays from a number of displays, based on display attributes of each display, yielding display collection attributes for each collection of displays. The second computer-readable code is to determine whether any of a number of messages should be displayed on any of the collections of displays, based at least on message attributes of each message and on the display collection attributes of each collection of displays. The third computer-readable code is to, where the second computer-readable cause has determined that a given message should be displayed on a given collection of displays, cause at least a portion of the given message by the computing device to be transmitted to each display within the given collection of displays to display the given message on the given collection of displays.

BRIEF DESCRIPTION OF THE SEVERAL VIEWS OF THE DRAWINGS

The drawings referenced herein form a part of the specification. Features shown in the drawing are meant as illustrative of only some exemplary embodiments of the invention, and not of all embodiments of the invention, unless otherwise explicitly indicated, and implications to the contrary are otherwise not to be made.

DETAILED DESCRIPTION

In the following detailed description of exemplary embodiments of the invention, reference is made to the accompanying drawings that form a part hereof, and in which is shown by way of illustration specific exemplary embodiments in which the invention may be practiced. These embodiments are described in sufficient detail to enable those skilled in the art to practice the invention. Other embodiments may be utilized, and logical, mechanical, and other changes may be made without departing from the spirit or scope of the present invention. The following detailed description is, therefore, not to be taken in a limiting sense, and the scope of the embodiment of the invention is defined only by the appended claims.

As noted in the background section, displays include both relatively small-sized displays and relatively large-sized displays. One way of leveraging a display of a given size to create an even larger display is to use a number of displays as a single display. Typically the displays are of the same type, and positioned adjacent to one another in a rectangular grid pattern. The displays are usually under control of the same party. The same message may be displayed on each display, or an appropriate portion of a message may be displayed on each display so that in total the displays function as a larger single display.

By comparison, embodiments of the invention provide for more diverse uses of displays. Displays may be of the same or different types, including their sizes, and their locations, such as their absolute locations and/or their locations relative to other displays. The party that controls each display may be different as well. Various collections of displays are created from all such possible displays, and display collection attributes of each such collection can be abstracted from the display attributes of each collection's constituent displays. Disparate examples of such display collections are presented later in the detailed description.

To determine whether any of a number of messages is to be displayed on any of the collections of displays, message attributes of each message can be analyzed in relation to the display collection attributes of the collections of displays, as well as in relation to the current conditions in which the collections are operating. When it is determined that a given message is to be displayed on a given collection of displays, at least a portion of the given message is transmitted to each display of the given collection. As such, the given collection of displays then displays the given message for viewing by one or more users.

Figure 1:
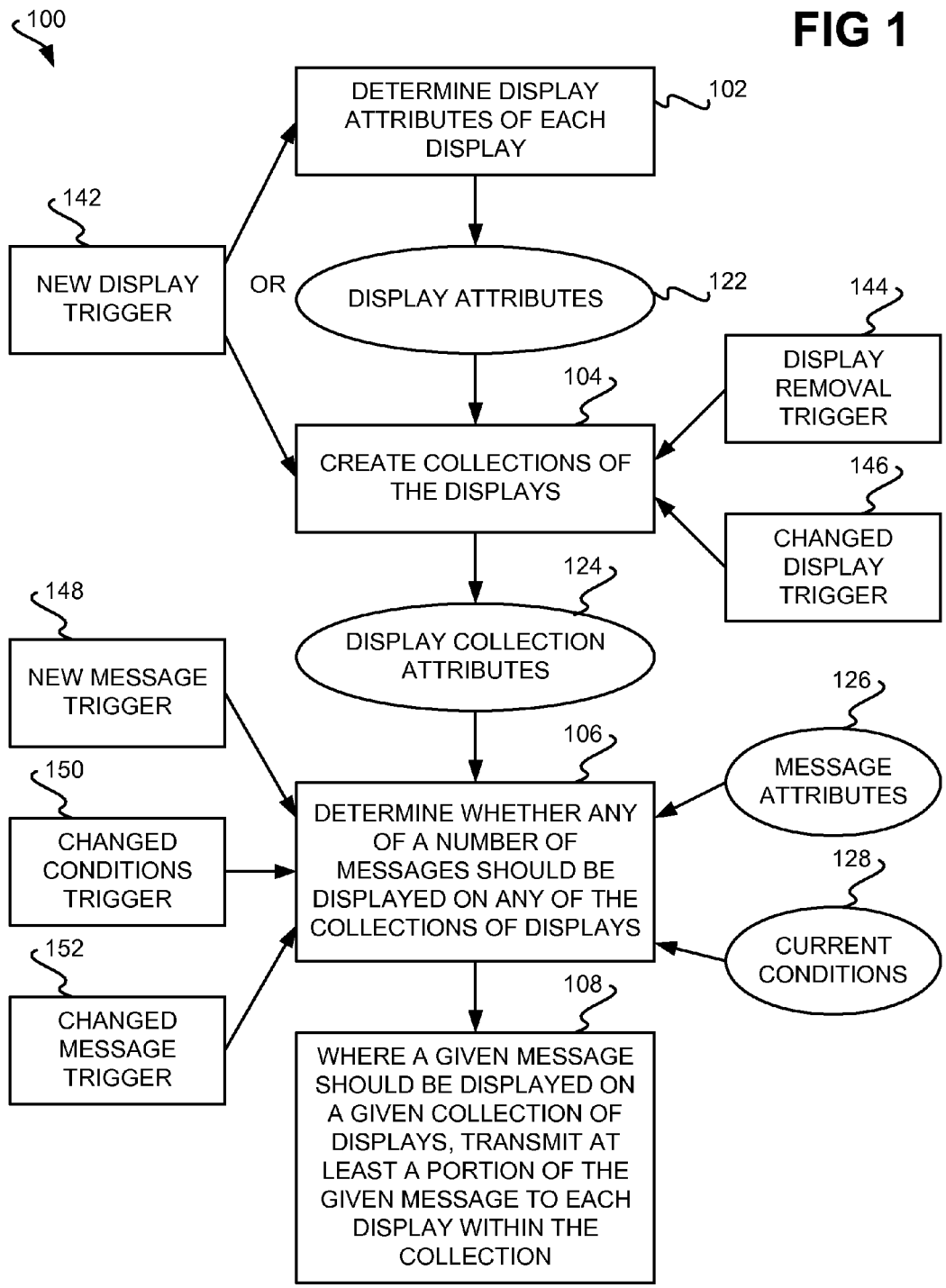
FIG. 1 is a flow diagram of a method, according to an embodiment of the present invention.

FIG. 1 is a flow diagram of a method 100, according to an embodiment of the invention. At least some parts of the method 100 may be performed by a computing device. For example, one or more computer programs stored on a computer-readable data storage medium, such as a hard disk drive or a semiconductor memory, may be executed by a processor of the computing device. Execution of the computer programs by the processors results in the method 100 being performed.

Display attributes of each of a number of displays are determined (102). In one embodiment, the display attributes are determined by receiving user input corresponding to the display attributes. In another embodiment, the display attributes are determined by receiving communication from each display, where the communication received from a given display corresponds to the display attributes of this display. In this embodiment, the display attributes may be generated at each display and transmitted to the computing device performing the method 100, without user interaction.

The display attributes of a display describe the properties of the display. Various exemplary display attributes are now presented. One display attribute includes the physical size, or dimensions, of the display, whereas another display attribute is the size of each pixel that can be displayed by the display, as well as the brightness of the display in accordance with some unit of measure. The display attributes can also include the location of a display, such as the latitude or longitude of the display, the name of a building on which the display is located, the address of such a building, and so on. The display attributes in this respect may further include the direction in which the display is facing. The display attributes can also include whether the display has sound capabilities, either via internal speakers or via external speakers that can be connected to the display.

It is noted that each display may be owned and/or operated by a party other than that for which or by which the method 100 is being performed. As such, the display attributes of a display may include the party that owns and/or operates the display. That is, some displays may be owned and/or operated by a first party, other displays may be owned and/or operated by a second party, still other displays may be owned and/or operated by a third party, and so on. Likewise, the display attributes can include the cost to use the display, per unit of time, as well as when the display can be used to perform the method 100. The display attributes in this respect may also include various restrictions of use of the display, such as certain types of advertising not being permitted to be displayed on the display, as well as when the display can be used.

It is further noted that a display may be intended to be viewed by users that are moving. For example, displays located within airports, displays located on billboards or on buses or other vehicles, as well as displays located on buildings, are typically not viewed by people who remain stationary for any great length of time. As such, the display attributes can include the cognition time of the display, which is the expected length of time that viewers have to view the display to understand or comprehend the contents being displayed on the display. The display attributes may in a related manner include the display rendering quality of the display, which indicates how well the display displays contents under various conditions. For example, some displays may be difficult to view in full-sun conditions, whereas other display may be difficult to view in rainy conditions.

The output of part 102 of the method 100 is thus display attributes 122 for each display in question. The method 100 then creates collections of the displays, based on the display attributes of the displays (104). A collection of displays is a grouping of displays in accordance with some specified criterion or criteria. For example, all the stationary displays at a given location that face the same direction may be considered a collection of displays. In general, collections of displays may be created in a variety of different manners. Rule-based approaches may be employed, for instance, as well as heuristic engines and other types of approaches.

For example, displays that are similar to one another, in size, direction in which each display is facing, and/or owner, and so on, may be grouped as a collection of displays. As another example, displays that are complementary to one another, such as being contiguous in position, being spaced along on a same route, allowing or disallowing the same type of content, and so on, may be grouped as a collection of displays. A feedback mechanism may be used in one embodiment, by which the message attributes of the most frequent messages requested to be displayed are periodically analyzed, and collections of displays that most likely satisfy these message attributes correspondingly created.

Creating a collection of displays results the collection having a number of display collection attributes. The display collection attributes of a collection of displays describe properties of the collection as a whole, and can be abstracted from the individual displays themselves. For example, whether a collection of displays has good display rendering quality can be based on the lowest display rendering quality of any individual display. Likewise, the times at which a collection of displays may be used may be the intersection, or logical ANDing, of the times of use at which the displays within the collection may individually be used.

The display collection attributes of a collection of displays may indicate the number of displays within the collection, as well as, where the displays are contiguously positioned next to one another, the total size of the resulting virtual display. The display collection attributes may thus specify whether the displays are contiguously positioned next to one another, or whether they are disparately located, such as is the case for a series of billboard displays along the side of a road. In general, the properties described by the display collection attributes are those that are relevant to determining whether a given message should be displayed on the collection of displays in question.

The output of part 104 of the method 100 is thus display collection attributes 124 for each collection of displays that has been created. The method 100 then determines whether any of a number of messages should be displayed on any of the collections of displays (106). The determination in part 106 is based on the display collection attributes 124 of each collection of displays, as well as on message attributes 126 of each message, and current conditions 128 regarding the location of each collection of displays.

The message attributes of a message generally specify the properties of the message, as well as the conditions under which the message can be displayed. The message attributes can include the image, including moving images such as video, and text that is to be displayed. The message attributes may include the length of the message. For example, where the message is text, it may have a number of textual characters that is the length of the message. The message attributes may also include whether the message has any sound needs, such as whether or not the message includes sound, as well as at what volume, and so on, at which the sound of the message is to be output.

A message may be appropriately displayed just at certain times of day. For example, a message pertaining to an advertisement for a restaurant may be desirably displayed just when the restaurant is open. In this case, the message attributes include the days and times at which the message is to be displayed. The message attributes can similarly include the number of times the message is to be repeated within a given time, as well as whether the message is permitted to be repeated.

A message may include more important parts and less important parts. For example, an advertisement may have important text that is surrounded by a border, where it is less important if the border is completely displayed. As such, the message attributes can include or specify the areas of unimportance of the message, which are those areas that do not have to be displayed, or that do not have to be displayed with as great as clarity as other, more important parts of the message. Similarly, the minimum percentage of the message that has to be displayed on a collection of displays may be specified within the message attributes. For example, a collection of contiguous displays organized as a grid typically has gaps between the individual displays, owing to the bezels of the individual displays. The minimum percentage of the message that has to be displayed thus indicates the maximum percentage of space that these gaps can occupy.

The message attributes can specify the border of the message itself, as well as how or whether the message can be fitted to a collection of displays. For example, the message attributes may indicate that if the size of a message is smaller than the amount of area afforded by the collection of displays, then the message should be centered on the collection, stretched to fit the collection, or repeated a number of times to fit the collection. The message attributes may indicate the quality of the collection of displays that can be used to display the message, such as the minimum brightness, resolution, and/or pixel size of the collection. The message attributes may similarly limit the displaying of the message to a type of collection of displays, such as displays that are permanently positioned, or displays that are movably positioned, the latter which can include displays on buses, and so on.

The message attributes of a message can specify the cognition time, which is the expected length of time that viewers have to view the message to understand the message. A message that includes a substantial amount of text, for instance, is likely to have a longer cognition time than a message that is simply a logo for a product. The message attributes can further specify the maximum cost that is willing to be paid to display the message. For example, the per unit of time cost for displaying a message on a collection of displays is equal to the sum of the per unit of time costs for using each constituent display of the collection.

A message may be best viewed under certain weather and/or lighting conditions. For example, an advertisement for umbrellas is best viewed during rainy conditions, whereas an advertisement for automotive headlights is best viewed at night (i.e., no-light conditions). The message attributes may thus specify the conditions under which the message is to be displayed. Likewise, a message may be best viewed when the viewers of the message have an expected mood. For example, an advertisement for vacationing in a certain Caribbean island may not be considered as appropriate by the viewers if the island recently experienced a hurricane. As another example, an advertisement for investing in a particular mutual fund may not be considered as appropriated by the viewers if the stock market recently experienced a big decrease. As such, the message attributes can specify the expected or anticipated mood of the viewers in relation to the message.

The current conditions regarding the location of a collection of displays can include the weather at the location, as well as other information regarding the location that can change over time. For example, the current conditions may indicate whether a relatively large number of people are expected to be within the area at a current time. At an airport, such current conditions may correspond to the departure and arrival times of flights. At a downtown location in a city, such current conditions may correspond to whether it is a workday, and whether it is currently morning, lunchtime, or evening. It is noted, therefore, that the current conditions can include the present day and time at the location. With respect to time, the granularity at which time is provided may just be the current hour, or even just whether the current time is early morning, mid-morning, late morning, early afternoon, mid-afternoon, late afternoon, and so on.

Whether any message should be displayed on any collection of displays can be determined in part 106 in a number of different ways, such as a rule-based approach, by using a heuristic engine, and so on. As one example, the message attributes 126 may be compared to the display collection attributes 124 and the current conditions 128. If the message attributes 126 are satisfied by at least a threshold of these display collection attributes 124 and these current conditions 128, then the message in question is to be displayed on the display collection in question. In one embodiment, the threshold can in fact be 100%, indicating that all the message attributes 126 of a message have to be satisfied by the display collection attributes 124 of a collection of displays and by the current conditions 128 regarding the location of this collection in order for the message to be displayed on this collection of displays.

When a given message is to be displayed on a given collection of displays, as determined in part 106, at least a portion of the given message is transmitted to each display within the collection (108). The displays may be communicatively connected to the computing device in a variety of different ways, such as in a wired or wireless manner, through a network or directly, and so on. In response to receiving a portion (or more) of a message, an individual display displays this portion, for viewing by viewers within the location of the display.

For example, each display of a collection of displays may be assigned a different portion of a message, such that the different portions of the message make up a contiguous single image. As such, a different suitable portion of the message is transmitted to each display. In this way, the collection of displays serves as a single virtual display that displays the contiguous image as a whole, where the virtual display is larger than any individual display within the collection.

As another example, each display of a collection of displays may be assigned the message in its entirety. As such, the entire message is transmitted to each display. The collection of displays thus does not serve as a single virtual display that displays the message as a whole, but rather as a grouping of individual displays that each display the message. This repetitive display effect can be advantageous in terms of viewers noticing the message.

As a related third example, each display of a collection of displays may be assigned a different portion of a message, but the different portions of the message do not make up a contiguous single image. A different suitable portion of the message is transmitted to each display. However, the collection of displays does not serve as a virtual display that displays a contiguous single image. Rather, the collection of displays corresponds to a grouping of individual displays that each display a different disparate portion of the message.

Once the parts 102, 104, 106, and 108 of the method 100 have been performed, various triggers can result in repeating performance of the method 100 starting at various parts thereof. For example, in response to detecting that a new display has been added to the displays (142), the method 100 may be repeated starting at part 102 or part 104. Specifically, where the display attributes of the new display are not yet known, then the method 100 may be repeated starting at part 102, whereas if the display attributes of the new display are already known, then the method 100 may be repeated starting at part 104. In either case, the collections of displays are recreated in part 104, it is again determined whether any message should be displayed on any collection in part 106, and so on.

Similarly, in response to detecting that an existing display has been removed (144), the method 100 is repeated beginning at part 104, so that the collections of displays may be recreated such that they no longer include this display. Likewise, if the display attributes of a display have changed (146), the method 100 is repeated beginning at part 104. In both these cases, once the collections of displays have been recreated, it is again determined whether any message should be displayed on any collection in part 106, and so on.

In response to detecting that a new message has been added (148), the method 100 is repeated beginning at part 106, particularly to determine whether this new message should be displayed on any of the collections of displays. It is noted in this case that the collections of displays do not themselves have to be recreated, because no change has occurred to the displays themselves. Likewise, in response to detecting that the message attributes of an existing message have changed (150), the method 100 is repeated beginning at part 106, particularly to determine whether this modified message should be displayed. Similarly, in response to detecting that any of the current conditions of the locations in which the collections of displays are situated have changed (152), the method 100 is repeated beginning at part 106, to determine whether any of the messages should now be displayed. From part 106 in all three of the cases, if it is determined that a given message should be displayed on a given collection of displays, then part 108 is performed.

Figure 2:
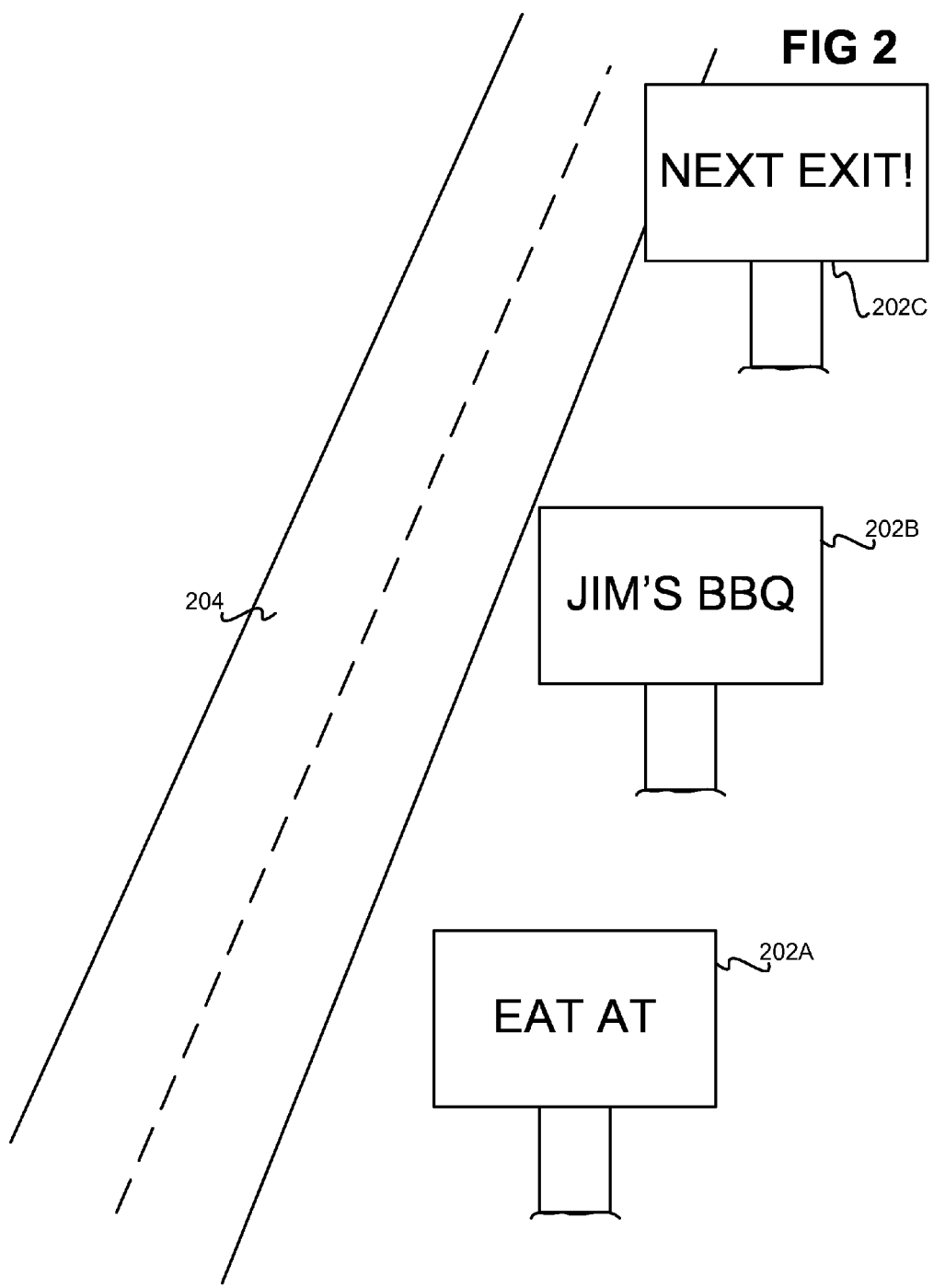
FIG. 2 is a diagram of a first exemplary usage scenario, according to an embodiment of the present invention.
Figure 3:
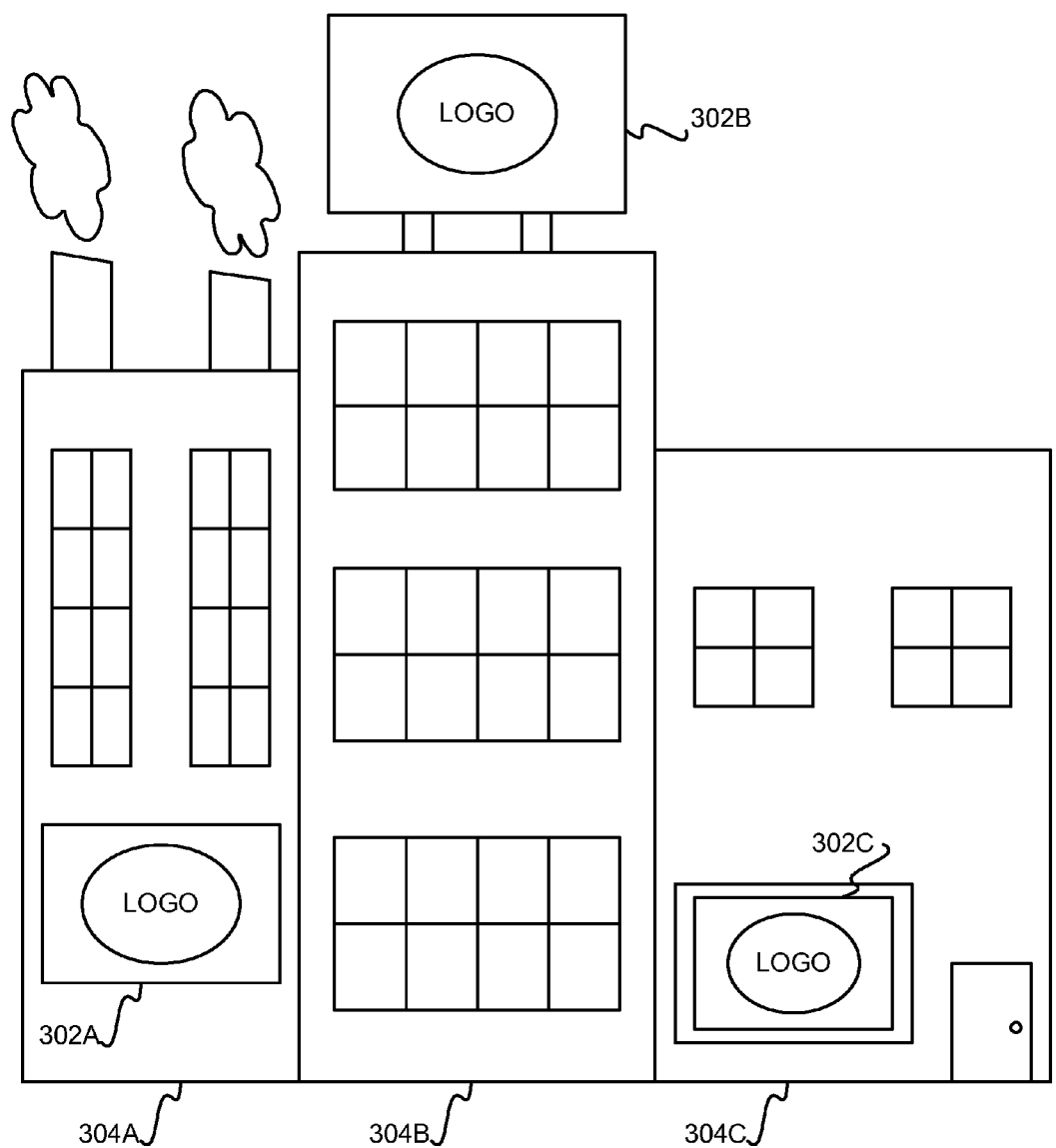
FIG. 3 is a diagram of a second exemplary usage scenario, according to an embodiment of the present invention.
Figure 4:
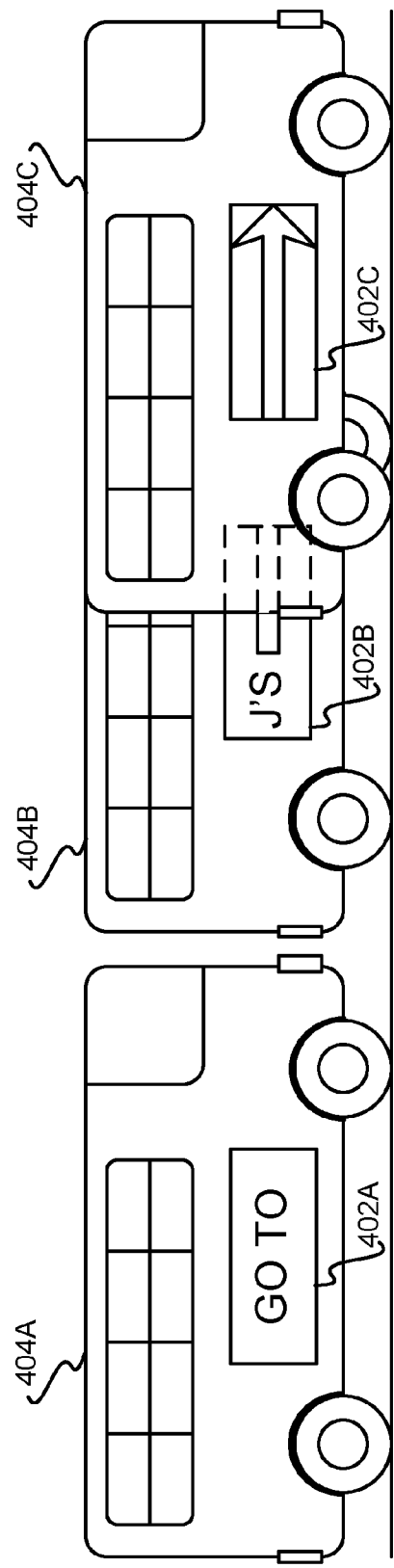
FIG. 4 is a diagram of a third exemplary usage scenario, according to an embodiment of the present invention.

FIGS. 2, 3, and 4 show exemplary usage scenario contemplated by different embodiments of the invention. In FIG. 2, three displays 202A, 202B, and 202C, collectively referred to as the displays 202, are specifically billboard displays located at various distances away from one another along a road 204. The displays 202 are electronic displays, so that messages can be sent to the displays 202 for display thereon.

Some display attributes of each display 202 may be identical. These identical display attributes may include the physical size of each display 202, and the brightness of each display 202. Such identical display attributes may also include the direction in which each display 202 is facing, and that each display 202 does not have sound capabilities. Other identical display attributes include the cost for displaying a message on each display 202 as a function of time, as well as that the displays 202 are difficult to view in full-sun or bright-light conditions. By comparison, other display attributes of the displays 202 may be similar, but different. These different display attributes may include the location of each display 202 with respect to the road, where each such location is slightly different.

The display collection attributes of the collection of displays 202 are abstracted from the display attributes of the individual displays 202. For instance, the display collection attributes may include the fact that there are three displays 202 located along a particular stretch of road and facing a particular direction. The display collection attributes may include the physical size of each display 202, and the brightness of all the displays 202, as well as that none of the displays 202 within the collection have sound capabilities. The display collection attributes may include the cost for displaying a message on the displays 202 as a function of time, as being equal to three times the cost for displaying a message on any given display 202. The display collection attributes may further include that the displays 202 are difficult to view in full-sun or bright-light conditions.

The message in FIG. 2 is "EAT AT JIM'S BBQ NEXT EXIT." The message attributes may specify that the message can be separated onto discontiguous displays between the words "AT" and "JIM's," as well as between the words "BBQ" and "NEXT." The message attributes include this text, too, as well as the length of the message in characters. The message attributes may specify that the message does not have any sound needs. The message attributes may further include that the message is to be displayed during the hours when the restaurant is open, such as between the hours of noon and 10 PM daily, and that the message can be repeated an unlimited number of times. The message attributes of the message may also specify the minimum brightness of the collection of displays on which it can be displayed, and the total cost that is willing to be paid to display the message.

Assuming that the cost and brightness display collection attributes of the collection of displays 202 suitably match the cost and brightness message attributes of the message, the message is displayed on the displays 202 when the restaurant is open (i.e., between noon and 10 PM), and when there are not full-sun or bright-light conditions. For example, on rainy and cloudy days, the message may be displayed beginning at noon. By comparison, on sunny days, the message may not be displayed until sunset. In either case, the message is not displayed after 10 PM, which is when the restaurant closes.

In FIG. 3, three stationary displays 302A, 302B, and 302C, collectively referred to as the displays 302, are positioned on three buildings 304A, 304B, and 304C, collectively referred to as the buildings 304, respectively. The display 302A is mounted on a wall of the building 304A, which is a factory. The display 302B is mounted on the roof of the building 304B, which is an office building. The display 302C is mounted within the window of the building 302C, which is a store. The displays 302 are electronic displays, so that messages can be sent to the displays 302 for display thereon.

Some display attributes of each display 302 may be identical, such as the direction in which each display 302 is facing, and that each display 302 does not have sound capabilities. By comparison, other display attributes of the displays 302 may be different. For instance, the physical size and/or the brightness of each display 302 may be different, as well as the cost for displaying a message on each display 302 as a function of time. The locations of the displays 302 are different, and can specify the buildings 304 on which they are located, as well as the positions on these buildings 304. The display 302A may be usable at any time of day on any day; the display 302B may be usable just in the evenings on weekdays and all day on weekends; and, the display 302C may be usable just in the evenings regardless of the day of the week.

The display collection attributes of the collection of displays 302 are abstracted from the display attributes of the individual displays 302. For instance, the display collection attributes may include the fact that there are three displays 302, located on buildings on a particular street (i.e., such that the buildings are said to be at the same location) facing a particular direction. The display collection attributes may include the physical size of each display 302, and the brightness as the lowest brightness of any display 302. The display collection attributes may include the cost for displaying a message on the displays 302 as a function of time, as being equal to the sum of the cost for display a message on each individual display 302. The display collection attributes may further include that the collection of displays 302 as a unit are available just during the evenings, which is when all three displays 302 are available.

The message in FIG. 3 is a logo of a company, product, or service. The message attributes may specify that the message is to be repeated on each display of a collection of displays, centered, and zoomed to fit. The message attributes may further specify that it can be displayed on any collection of displays that includes at least three constituent displays. The message attributes may also specify that the message is to be displayed on during the weekends, but at any time on the weekends. The minimum brightness and maximum cost for displaying the message may be a part of the message attributes as well.

Assuming that the cost and brightness display collection attributes of the collection of displays 302 suitably match the cost and brightness message attributes of the message, the message is displayed on the displays 302 during the evenings and on the weekends. Note that although the collection is available during the evenings during the week as well, the message is not to be displayed during the week. Likewise, although the message can be displayed at any time during the weekend, the collection of displays 302 is not available during the weekend except in the evenings.

In FIG. 4, three displays 402A, 402B, and 402C, collectively referred to as the displays 402, are positioned on three movable vehicles 404A, 404B, and 404C, collectively referred to as the vehicles 404, respectively. In the example of FIG. 4, the vehicles 404 are stopped at a red light on a one-way street having two lanes. The vehicles 404A and 404C are both located in the lane closest to the viewpoint of FIG. 4. By comparison, the vehicle 404B is located in the lane farthest from the viewpoint of FIG. 4, such that the visibility of the vehicle 404B and its display 402B is partially blocked by the vehicle 404C. However, the hidden portion of the display 402B is depicted by dotted lines in FIG. 4 for illustrative convenience. The displays 402 are electronic displays, so that messages can be sent to the displays 402 for display thereon. The displays 402 are functional even when the vehicles 404 are moving, but are also functional when the vehicles 404 have stopped.

Some display attributes of each display 402 may be identical. These identical display attributes may include the physical size of each display 402, and the brightness of each display 402. Such identical display attributes may also include that the displays 402 are movable displays, insofar as they are mounted on movable vehicles 404, and that each display 402 does not have sound capabilities. Other identical display attributes include the cost for displaying a message on each display 402 as a function of time.

The display collection attributes of the collection of displays 402 are abstracted from the display attributes of the individual displays 402. For instance, the display collection attributes may include the fact that there are three displays 402 located on three different vehicles 404. The display collection attributes may include the physical size of each display 402, and the brightness of all the displays 402, as well as that none of the displays 402 within the collection have sound capabilities. The display collection attributes may include the cost for displaying a message on the displays 402 as a function of time, as being equal to three times the cost for displaying a message on any given display 402.

The message in FIG. 4 is "GO TO J'S," followed by an arrow pointing to the right. The message attributes may specify that the message can be separated onto discontiguous displays between any adjacent pair of words. The message attributes include this text, too, as well as the length of the message in characters. The message attributes specify the minimum length of the arrow, in units of measure, and that the message is to be displayed on a collection having between two and four displays. The message attributes may also specify that if there are more than two displays within a collection, then the arrow itself is to be extended in length so that the message is displayed over all the displays of the collection.

The message attributes may specify that the message does not have any sound needs, but that the message only is to be displayed when the vehicles 404 are temporarily stopped. The message attributes may also specify that display of the message is to result in the arrow pointing in the direction of where J's is located, where J's may be a store, for instance. The message attributes may further specify the minimum brightness of the collection of displays on which it can be displayed, and the total cost that is willing to be paid to display the message.

Assuming that the cost and brightness display collection attributes of the collection of displays 402 suitable match the cost and brightness message attributes of the message, the message is displayed when the current conditions indicate that at least two of the vehicles 404 have temporarily stopped moving, and that display of the message results in the arrow pointing in the direction of where Js is located. In this embodiment, the current conditions include the locations of the vehicles 404. The current conditions also include whether each such vehicle 404 is currently moving or has temporarily stopped moving.

In another embodiment, the collection of displays 402 may not be created until one or more of the vehicles 404 have stopped. In such case, the collection is created based on which vehicles 404 have stopped, and which vehicles 404 are close to one another, such as having stopped at the same red light no farther than a number of car lengths apart. That is, the display attributes of each display 402 includes the current location of the display 402 (i.e., the current location of the vehicle 404 on which it is mounted), and whether the display 402 is currently moving or has temporarily stopped moving (i.e., the corresponding vehicle 404 has stopped moving).

In the example of FIG. 4, all three vehicles 404 have stopped. Because the collection of vehicles 404 includes three vehicles, which is between the minimum and maximum number of vehicles specified by the message attributes, the message is displayed on the displays 402. Due to the physical sizes of the displays 402, it is determined that the words "GO TO" are to be displayed on the display 402A, and the word "J'S" is to be displayed on the display 402B. Furthermore, it is determined that there is sufficient space left on the display 402B to start the arrow on this display 402B, where the arrow extends onto and ends at the display 402C, as shown in FIG. 4.

FIGS. 2, 3, and 4 thus illustrate the ways in which collections of disparate and similar displays can be created, and how the display collection attributes of these collections can be abstracted from the display attributes of the constituent displays of the collections. Furthermore, these figures illustrate how the display collection attributes, and in some cases the current conditions of the locations of the display collections, are matched to the message attributes of a message to determine whether the message is to be displayed on a given collection of displays. Embodiments of the invention provide for great flexibility in specifying the display attributes, display collection attributes, and message attributes, as well as the current conditions. As such, collections of displays are easily created, and when and how a given message is to be displayed can be easily specified via the message's message attributes.

Figure 5:
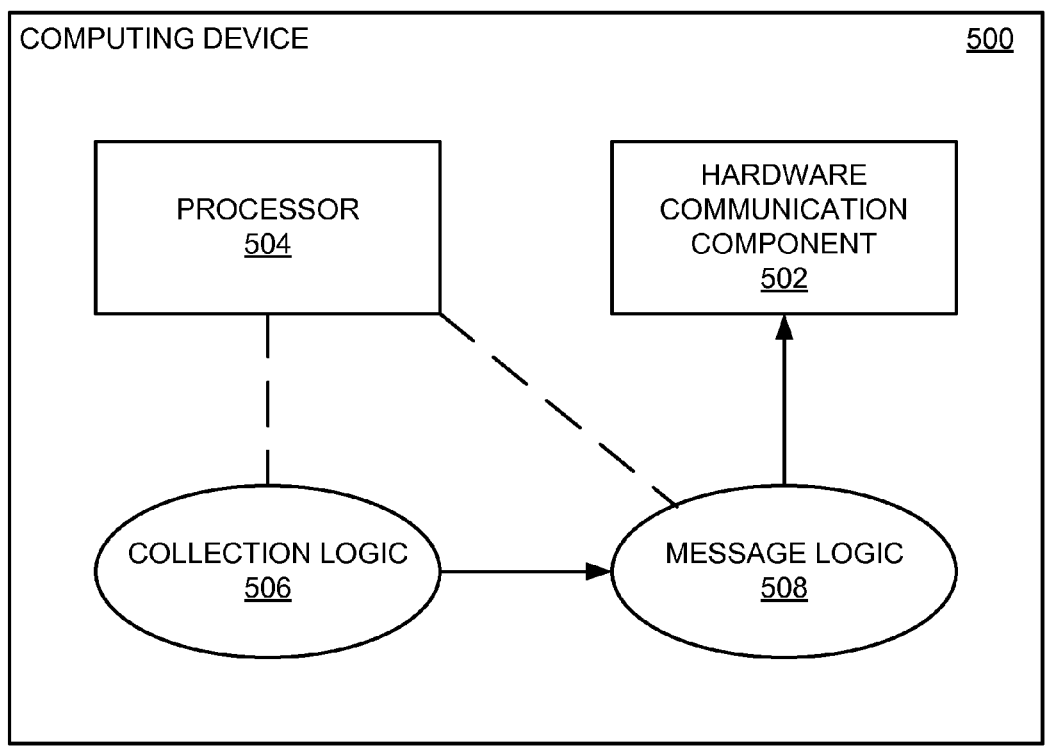
FIG. 5 is a diagram of a representative computing device, according to an embodiment of the present invention.

In conclusion, FIG. 5 shows a representative computing device 500, according to an embodiment of the invention. The computing device 500 includes hardware, such as a hardware communication component 502 and a processor 504. The computing device 500 can and typically does include other types of hardware, such as memory, storage devices, and so on. The computing device 500 further includes collection logic 506 and message logic 508.

The hardware communication component 502 is a hardware component that permits the computing device 500 to communicate with displays. For instance, the communication component 502 may be or include a network adapter, such as a wired or a wireless network adapter, and/or may be or include a display interface, such as a VGA or DVI interface. When a given message is to be displayed on a given collection of displays, the hardware communication component 502 transmits at least a portion of the message to each display within the collection.

The collection logic 506 and the message logic 508 are each implemented by the processor 504, as indicated by dotted lines in FIG. 5. For example, the logic 506 and the logic 508 may each be one or more computer programs that are executed by the processor 504, and in this way the processor 504 is said to implement the logic 506 and the logic 508. The collection logic 506 creates one or more collections of displays from a number of such displays, based on display attributes of each display, and which yields display collection attributes for each collection created.

The message logic 508 receives these display collection attributes from the collection logic 506. In turn, the message logic 508 determines whether any of a number of messages should be displayed on any of the collections of displays, based on the message attributes of each message, on the display collection attributes of each collection, and on the current conditions of each collection. When the message logic 508 determines that a given message is to be displayed on a given collection of displays, it instructs the hardware communication component 502 which portion(s) of the message to transmit to each display of the collection in question.

Therefore, the hardware communication component 502, the collection logic 506, and the message logic 508 can perform at least some parts of the method 100 of FIG. 1. Specifically, the collection logic 506 may perform parts 102 and/or 104. The message logic 508 may perform part 106.

The hardware communication component 502 may perform part 108. The triggers 142, 144, and 146 of FIG. 1 may trigger the collection logic 506, where output from the logic 506 then triggers the message logic 508, and where output from the logic 508 triggers the communication component 502. The triggers 148, 150, and 152 by comparison trigger the message logic 508, where output from the logic 508 triggers the component 502.

As can be appreciated by one those of ordinary skill within the art, aspects of the present invention may be embodied as a system, method or computer program product. Accordingly, aspects of the embodiments of the invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

In general, a computer program product includes a computer-readable medium on which one or more computer programs are stored. Execution of the computer programs from the computer-readable medium by one or more processors of one or more hardware devices causes a method to be performed. For instance, the method that is to be performed may be one or more of the methods that have been described above.

The computer programs themselves include computer program code. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It is finally noted that, although specific embodiments have been illustrated and described herein, it will be appreciated by those of ordinary skill in the art that any arrangement calculated to achieve the same purpose may be substituted for the specific embodiments shown. This application is thus intended to cover any adaptations or variations of embodiments of the present invention. As such and therefore, it is manifestly intended that this invention be limited only by the claims and equivalents thereof.

We claim:

1. A method comprising:
   creating one or more collections of displays from a plurality of displays of a plurality of movable vehicles, by a computing device, based on a plurality of display attributes of each display, to yield a plurality of display collection attributes for each collection of displays;
   determining whether any of a plurality of messages should be displayed on any of the collections of displays, by the computing device, based at least on a plurality of message attributes of each message and on the display collection attributes of each collection of displays; and,
   where the computing device has determined that a given message should be displayed on a given collection of displays,
      transmitting at least a portion of the given message by the computing device to each display within the given collection of displays to display the given message on the given collection of displays,
   wherein determining whether any of the messages should be displayed on any of the collections of displays comprises, where a given collection of displays of the one or more collections of displays includes the displays of a sub-plurality of the movable vehicles that are currently in visible proximity to one another:
      determining that one or more given movable vehicles of the sub-plurality have temporarily stopped moving;
      determining that the given message should be displayed in a distributed manner over the displays of the movable vehicles of the sub-plurality the distributed manner taking into account a relative position of each movable vehicle within the sub-plurality, an extent to which the movable vehicles within the sub-plurality overlap one another from a particular vantage point, and which of the movable vehicles of the sub-plurality are currently moving and which of the movable vehicles of the sub-plurality have temporarily stopped moving.

2. The method of claim 1, further comprising:
   detecting that a new display has been added to the plurality of displays or that an existing display has been removed from the plurality of displays, and,
   in response to detecting that the new display has been added or that the existing display has been removed, repeating the method at creating the collections of displays from the plurality of displays.

3. The method of claim 1, further comprising:
   detecting that the display attributes of an existing display within the plurality of displays have changed; and,
   in response to detecting that the display attributes of an existing display have changed, repeating the method at creating the collections of displays from the plurality of displays.

4. The method of claim 1, further comprising:
   detecting that a new message has been added to the plurality of messages or that an existing message has been removed from the plurality of messages; and, in response to detecting that the new message has been added or that the existing message has been removed, repeating the method at determining whether any of the messages should be displayed on any of the collections of displays.

5. The method of claim 1, further comprising:
detecting that the message attributes of an existing message within the plurality of messages have changed; and,
in response to detecting that the message attributes of the existing message have changed, repeating the method at determining whether any of the messages should be displayed on any of the collections of displays.

6. The method of claim 1, wherein determining whether any of the messages should be displayed on any of the collections of displays is further based on one or more current conditions of locations in which the collections of displays are situated.

7. The method of claim 6, further comprising:
detecting that any of the current conditions of the locations in which the collections of displays are situated have changed; and,
in response to detecting that any of the current conditions of the locations in which the collections of displays are situated have changed, repeating the method at determining whether any of the messages should be displayed on any of the collections of displays.

8. The method of claim 1, wherein the displays comprise:
one or more first displays owned and operated by a first party; and,
one or more second displays different than the first displays and owned and operated by a second party different than the first party.

9. The method of claim 1, further comprising determining the display attributes of each display by receiving user input corresponding to the display attributes of the display.

10. The method of claim 1, further comprising determining the display attributes of each display by receiving communication from the display as to the display attributes of the display, such that the display attributes are generated at each display and transmitted to the computing device without user interaction.

11. The method of claim 1, wherein the display attributes of each display comprise one or more of: a cost to use the display; a cognition time of the display, where the cognition time is an expected length of time that viewers have to view the display to understand contents displayed on the display; display rendering quality of the display, where the display rendering quality is how well the display displays contents under various conditions; and, restrictions of use of the display.

12. The method of claim 1, wherein the display collection attributes of each collection of displays are attributes abstracted from the display attributes of the displays of the collection.

13. The method of claim 1, wherein the message attributes of each message comprise one or more of: a cognition time of the message, where the cognition time is an expected length of time that viewers have to view the message to understand the message; conditions under which the message is to be displayed; mood of the viewers when the message is to be displayed; and, maximum cost willing to be paid to display the message.

14. A computing device comprising:
a processor;
first logic implemented by the processor to create one or more collections of displays from a plurality of displays of a plurality of movable vehicles, based on a plurality of display attributes of each display, yielding a plurality of display collection attributes for each collection of displays;
second logic implemented by the processor to determine whether any of a plurality of messages should be displayed on any of the collections of displays, based at least on a plurality of message attributes of each message and on the display collection attributes of each collection of displays; and,
a hardware communication component to, where the second logic has determined that a given message should be displayed on a given collection of displays, transmit at least a portion of the given message by the computing device to each display within the given collection of displays to display the given message on the given collection of displays,
wherein the second logic is to determine whether any of the messages should be displayed on any of the collections of displays by, where a given collection of displays of the one or more collections of displays includes the displays of a sub-plurality of the movable vehicles that are currently in visible proximity to one another:
determining that one or more given movable vehicles of the sub-plurality have temporarily stopped moving;
determining that the given message should be displayed in a distributed manner over the displays of the movable vehicles of the sub-plurality the distributed manner taking into account a relative position of each movable vehicle within the sub-plurality, an extent to which the movable vehicles within the sub-plurality overlap one another from a particular vantage point, and which of the movable vehicles of the sub-plurality are currently moving and which of the movable vehicles of the sub-plurality have temporarily stopped moving.

15. A computer program product comprising:
a storage device having computer-readable code embodied therein, the computer-readable code executable by a computing device, the computer-readable code comprising:
first computer-readable code to create one or more collections of displays from a plurality of displays of a plurality of movable vehicles, based on a plurality of display attributes of each display, yielding a plurality of display collection attributes for each collection of displays;
second computer-readable code to determine whether any of a plurality of messages should be displayed on any of the collections of displays, based at least on a plurality of message attributes of each message and on the display collection attributes of each collection of displays; and,
third computer-readable code to, where the second computer-readable cause has determined that a given message should be displayed on a given collection of displays, cause at least a portion of the given message by the computing device to be transmitted to each display within the given collection of displays to display the given message on the given collection of displays,
wherein the second logic is to determine whether any of the messages should be displayed on any of the collections of displays by, where a given collection of displays of the one or more collections of displays includes the displays of a sub-plurality of the movable vehicles that are currently in visible proximity to one another:

determining that one or more given movable vehicles of the sub-plurality have temporarily stopped moving;

determining that the given message should be displayed in a distributed manner over the displays of the movable vehicles of the sub-plurality the distributed manner taking into account a relative position of each movable vehicle within the sub-plurality, an extent to which the movable vehicles within the sub-plurality overlap one another from a particular vantage point, and which of the movable vehicles of the sub-plurality are currently moving and which of the movable vehicles of the sub-plurality have temporarily stopped moving.

\* \* \* \* \*